United States Patent [19]

Meier

[11] Patent Number: 5,174,515
[45] Date of Patent: Dec. 29, 1992

[54] DEVICE FOR GUIDING TUBES OR CABLES

[76] Inventor: Karl Meier, Westendstr. 12,, 8548 Heideck, Fed. Rep. of Germany

[21] Appl. No.: 644,168

[22] Filed: Jan. 22, 1991

[30] Foreign Application Priority Data

Jan. 23, 1990 [DE] Fed. Rep. of Germany ....... 4001880

[51] Int. Cl.⁵ ............................................. B65H 75/00
[52] U.S. Cl. ..................................... 242/54 R; 439/13
[58] Field of Search ................. 242/54 R; 439/13, 15, 439/164; 191/12 R, 12.2 R

[56] References Cited

U.S. PATENT DOCUMENTS 3,763,455 10/1973 Confer et al. ...................... 242/54 R
4,299,662 11/1981 Hardin, Jr. .......................... 376/260

FOREIGN PATENT DOCUMENTS 179156    4/1986  European Pat. Off. .
PS2362463 11/1978 Fed. Rep. of Germany .
G7732412  3/1982  Fed. Rep. of Germany .
371511802 11/1988 Fed. Rep. of Germany .
5615885  11/1979 Japan .

Primary Examiner—John M. Jillions
Attorney, Agent, or Firm—Dena Meyer Weker

[57] ABSTRACT

An assembly for guiding cables or tubes between a stationary part and a part which follows the movements of a bidirectionally rotatable body is provided, wherein the cables or tubes are arranged in two oppositely turning loops on both sides of the axis of rotation of the body.

14 Claims, 7 Drawing Sheets

DEVICE FOR GUIDING TUBES OR CABLES

FIELD OF THE INVENTION

The invention relates to an arrangement for guiding cables between a stationary part and a part which follows the movements of a bidirectionally rotatable body, wherein several cables are arranged adjacent to each other in the shape of a U-loop, concentrical to the axis of rotation. The free ends belonging to different loop strands are connected with the stationary part or the movable part.

BACKGROUND OF THE INVENTION

Frequently, there is a need to connect a bidirectionally rotatable device with a stationary device by means of cables. Examples include radar units and robots which are being increasingly used in production lines, such as welding robots in the automotive industry.

Such robots usually perform both translatory and rotatory movements. The rotatory movements are usually effected by turning the robot base about a vertical axis of rotation, ideally at the maximum possible angle of rotation. Such robots require various electric, pneumatic, and/or hydraulic supplies. For this purpose, numerous electrical cables and fluid supply tubes are required in order to connect the bidirectionally rotating robot with stationary supply sources and signal receivers.

One problem is to take up as little space as possible for guiding the cables while simultaneously preventing excessive mechanical strain and abrasion of the cables due to the rapid to and fro movements of the robot.

One way of guiding the cables of a bidirectionally rotatable device is to use a spiral cable, the ends of which are connected to a stationary device or a rotating robot base, as, for instance, described in DE-37 15 118 C2. In this case, a sturdy spiral and a stable guiding system are provided by an elastic outer strand which creates pre-tension in the unwinding direction and an elastic inner strand which creates pre-tension in the winding up direction. The outer and the inner strand are attached to the supply line over the entire length of the spiral or at attachment spots provided at pre-determined intervals. This solution works fairly well, but assembly costs are high and a relatively long cable is required to realize a certain maximum angle of rotation.

An alternative would be a drag chain as disclosed in DE-PS 23 62 463, but placing it on its side, as shown on page 15.2. of a brochure of the company "KABELSCHLEPP" relating to their "energy guiding device, Type 210." The construction provides for a rotatable body and a concentric, stationary housing, leaving open a ring-shaped recess for accommodating the drag chain. The chain is layed in a U-shaped loop into the ring-shaped recess at one side of the axis of rotation, and the free ends of both loop strands are attached to the rotatable body/stationary housing. Depending on the direction of rotation of the rotatable body, the drag chain either contacts the outer circumference of the rotatable body or the inner circumference of the stationary housing. The maximum rotation angle feasible with this construction is approximately 350°.

The drag chain is formed by two link chains the links of which are arranged on top of one another and are connected by a bar incorporating openings in which the cables which are arranged on top of one another are guided by the drag chain. The chain links of the lower link chain are provided with carrier rollers with which the chain on its support is carried such as to allow displacement of the chain. Lateral guide rollers project from the links of the upper chain. These rollers run on the outer circumference of the rotatable body/inner circumference of the housing.

The maximum possible angle of rotation which may be achieved using the known drag chain is not sufficient for many applications.

Since the rotatable body of most robots has to be supplied by numerous cables, which are placed on top of one another both in the spiral cable and the drag chain construction, the construction becomes very high and requires a lot of space.

There is a need for an assembly for guiding cables, which requires less space and allows for a greater angle of rotation, while requiring a shorter length of cable.

SUMMARY OF THE INVENTION

An assembly is provided where tubes or cables are divided into two loops which run in opposite directions, relative to the axis of rotation of the rotatable body, and which are each located on opposite sides of the axis of rotation.

As two loops are used instead of only one, the length of the cable which may be accommodated increases. In this way, the maximum angle of rotation is considerably larger. Compared to a spiral cable, a considerably shorter cable length allows for a large angle of rotation.

As only half the number of cables have to be arranged on top of one another, compared to conventional solutions, the total height of the guiding assembly is reduced by about half.

The loops are preferably guided in a ring-shaped canal between the rotatable body and a canal boundary, preferably in the form of a stationary housing. In most cases, the guiding canal is formed by the outer circumference of the rotatable body on the inside and by a housing arranged concentrically around the rotatable body on the outside. The assembly may also be constructed the other way around, i.e. the guiding canal may be formed by the inner circumference of a rotatable body on the outside and by the outer circumference of a stationary part of the unit on the inside.

Each loop may be formed by a conventional drag chain.

It is noted that drag chains are of rather complex constructions. The cables are subjected to considerable stress at the openings within the bars linking the chain elements, which may cause high abrasion and cable fracture. Therefore, the subsequently described embodiments are often preferred.

In the preferred construction, guiding rollers are arranged in a ring shape, concentrically around the axis of rotation of the rotatable body. The axes of rotation of these guiding rollers are parallel to the axis of rotation of the rotatable body. These guiding rollers are arranged between the loop strands of each loop, respectively. They are preferably driven by the rotation of the rotatable body, directly or indirectly, in that the circumferential rotating speed of the guiding rollers equals the speed at which the loop strands are unwound on the rotatable body and the guiding rollers.

The guiding rollers may touch each other at their outer circumferences for mutual rotatory drive. The guiding rollers are preferably driven in that the rotatable body pulls the loop strand winding up on its circumference, whereby the guiding roller located in the front of the corresponding loop is driven. This guiding roller will then drive all other guiding rollers.

In a particularly preferred embodiment of the invention, the outer circumference of the guiding rollers and/or the outer circumference and the inner circumference of the guiding canal are each provided with guiding recesses depending in number and shape on the number and dimensions of the cables or tubes to be guided. These recesses may be of different shape for taking up cables of different cross-sections. Guiding recesses located at equal axial height, however, have to be of the same shape for all guiding rollers, because the distribution of guiding rollers to the loops, around which the rollers run, may change during rotation of the rotatable body.

The guiding rollers may each be kept displaceable and rotatable at each axial end in a guiding groove of a guiding plate. At least one of the guiding grooves may be a T-shaped groove. The axle noses of the guiding rollers supported in said T-grooves are each provided with a complementary T-profile. The axle noses are kept rotatable, preferably by means of ball bearings.

In embodiments with guiding rollers, the individual cables are always subjected to the same bending radius. As the circumferential speed of the guiding rollers equals the speed at which the loop strands unwind on the rotatable body, there is no relative movement, and consequently no friction, between the cables and the rotatable body. In a construction where all guiding rollers are driven in the same direction of rotation, there is no relative movement between the cables and the guiding rollers, which makes the guiding system completely free from abrasion. In a construction with direct mutual drive of adjacent guiding rollers, where every second guiding roller displays a relative movement in relation to the cables, abrasion may still be kept at a negligible level, by suitable selection of the material of the guiding rollers, or at least of the guiding recesses and by allowing for ample dimensions of the guiding recesses of said guiding rollers.

Embodiments avoiding this friction source by driving all guiding rollers in the same direction of rotation are, however, particularly preferable. This may be achieved by providing reversing rollers between each adjacent pair of guiding rollers for reversing the direction of rotation. In this case, the guiding rollers will engage neither with the rotatable body nor the canal boundary but are exclusively driven by the reversing rollers.

Other embodiments include constructions, where the guiding rollers engage frictionally or mechanically at least with the circumference of the rotatable body. A frictional engagement mechanism is ensured by arranging a friction ring, for instance in the shape of an O-ring made from rubber or a plastic, placed at the circumference of each guiding roller. This friction ring allows for frictional drive of the individual guiding rollers by the circumference of the rotatable body.

A mechanical engagement mechanism may be effected, for instance, by providing each guiding roller with a toothed ring. When the rotatable body turns, the toothed rings will engage with each other, driving the guiding rollers.

Adjacent guiding rollers are kept apart by spacers in order to prevent the friction rings or toothed rings of adjacent guiding rollers from engaging with each other. Such spacers may be formed either by spacer bars connected with the axial ends of adjacent guiding rollers or, in the case of mechanical drive, by spacer rollers, in the form of toothed wheels which engage with the teeth of two adjacent guiding rollers.

Alternatively, not only the circumference of the rotatable body but also the stationary canal boundary may be allowed to frictionally or mechanically engage with the guiding rollers. In particular concerning mechanical engagement, for example by the toothed rings of the individual guiding rollers, the individual guiding rollers may be kept at the desired distance from each other without the use of spacer elements.

In case of an indirect drive of the guiding rollers by the rotatable body, the guiding roller may be driven by one or several cables in the tip of the loop where the rotation of the rotatable body causes the outer strand to decrease and the inner strand to increase correspondingly. In a particularly preferred embodiment, the load which would normally be exerted on the cables is avoided by a traction rope, preferably a steel rope, which is guided so tautly in at least one correspondingly narrow recess of each guiding roller and so tautly around the guiding rollers as to make the guiding rollers turn. In this construction, the recesses provided for the individual cables or tubes are large enough to avoid transmission of rotational forces from the cables to the guiding rollers, which would otherwise create tensional forces acting on the cables. Preferably, two steel, rubber or plastic ropes are used, running in a groove at each axial end of the guiding rollers. Instead of traction ropes, drive belts, such as V-belts or toothed belts, may be used, with complementarily shaped grooves in the guiding rollers, for example in a V-shape or a toothed shape.

Alternatively, the indirect drive, by cables, traction ropes, may be combined with the direct drive by a frictional or mechanical engagement mechanism between the rotatable body and the guiding rollers.

Although an even number of guiding rollers must be used, the rollers may be unequally distributed between the two loops. Preferably, each loop is assigned half of the number of guiding rollers. However, any other distribution is possible, too.

BRIEF DESCRIPTION OF THE DRAWINGS

In the following, the invention and some embodiments will be described in more detail, using the figures.

FIG. 7 is a segmental view of the rotatable body and three guiding rollers according to FIG. 6, with spacer rollers in between.

DETAILED DESCRIPTION OF THE PREFERRED EMBODIMENTS

Figure 1:
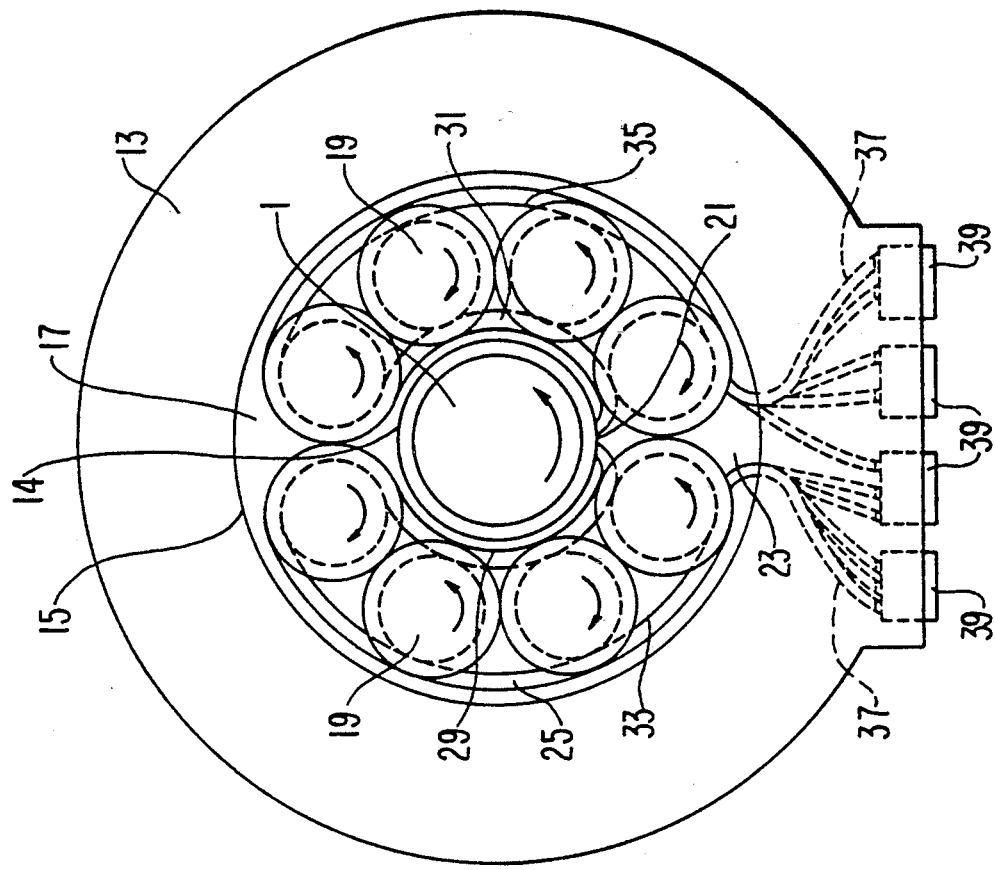
FIG. 1 is a schematic top view of a cable or tube guiding assembly according to the present invention.

In the embodiment shown in FIG. 1, it is assumed that a rotatable body 11, which is supplied by tubes or cables is arranged in the center. A housing 13 is concentrically arranged around the rotatable body 11. A ring-shaped guiding canal 17 is formed between an outer circumference 14 of the rotatable body 11 and an inner circumference 15 of the housing 13. Several guiding rollers 19 run in said guiding canal 17. The guiding rollers 19 are in mutual contact, so that they drive each other. A left U-loop 25 and a right U-loop 27 are laid between a part 21 following the rotatory movements of the rotatable body 11 and a stationary part 23 of housing 13. Each loop (25, 27) contains a pre-determined number of cables which are placed on top of one another in the direction of the axis of rotation. An even number of guiding rollers 19 are provided. In the embodiment shown, half of the rollers 19 are assigned to the left loop 25, the other half to the right loop, 27. Each loop is provided with an inner strand (29 and 31), running on the outer circumference 14 of the rotatable body 11, and an outer strand (33 and 35), running on the inner circumference 15 of the housing 13. The cables 37 of the loops 25 and 27 are connected with the connector 39 at the stationary parts 23.

When the rotatable body 11 turns in a counterclockwise direction, as indicated by the arrow, the inner strand 29 of the left loop 25, is pulled in the counterclockwise direction via the correspondingly rotating part 21. As a consequence, an increasing length of the inner strand 29 is wound onto the outer circumference 14 of the rotatable body 11. During this process, the guiding roller 19, which is located at the part where both strands 29 and 33 of the left loop are connected, is turned by the inner strand 29 which is being wound up, which in turn makes the other guiding rollers turn as well. During this rotatory movement of the rotatable body 11, an increasing portion of the outer strand 33 is brought into the area of the inner strand 29 via the leading guiding roller of this loop 25. In other words, more and more of the left loop 25 is unwound from the inner circumference 15 of the housing 13 and wound up on the outer circumference 14 of the rotatable body 11. The mutual drive of the guiding rollers 19 also drives the guiding rollers 19 located in the right loop 27. Due to the rotatory movement performed by the rotatable body 11 and the guiding rollers 19, an increasing portion of the right loop 27 is diverted from its inner strand 31 to its outer strand 35. In other words, the shifting between the outer strand and the inner strand is counter-directional in loops 25 and 27.

When the rotatable body 11 is turned in a clockwise direction, the two loops 25 and 27 move in the opposite direction.

Figure 2:
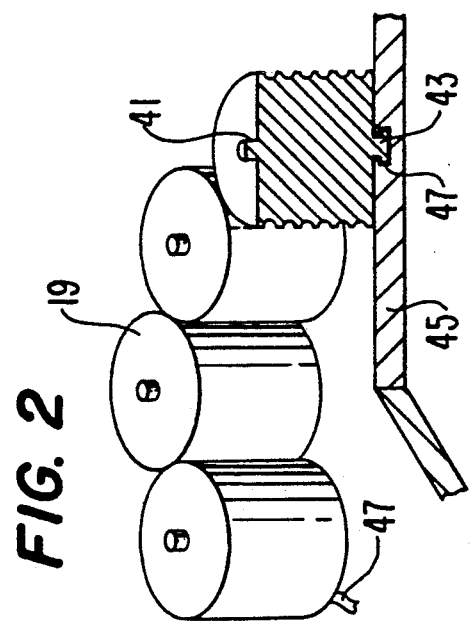
FIG. 2 is an oblique view of some guiding rollers, together with the supporting guiding plate.

As schematically shown in FIG. 2, the individual guiding rollers 19 are each provided with upper axle noses 41 and lower axle noses 43 at their longitudinal axial ends. Said axle noses 41 and 43 are each rotatably guided in the guiding groove of an upper/lower guiding plate. FIG. 2 shows only the lower guiding plate 45 with its guiding groove 47.

The guiding groove 47 is preferably T-shaped and the lower axle noses 43 are preferably provided with a complementary T-section. Alternatively, ball bearings may be provided in the guiding groove 47. In the embodiment shown in FIG. 5, ball bearings 55 are provided at the axle noses 41 and 43.

Figure 3:
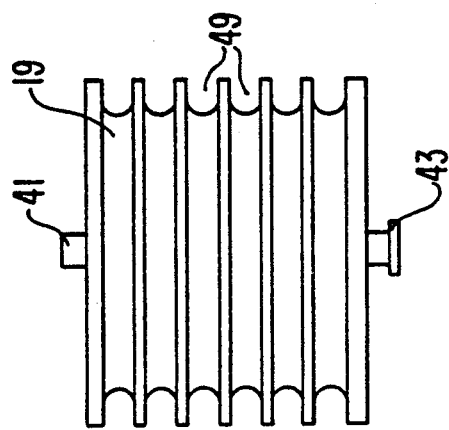
FIG. 3 is a lateral view of a guiding roller of an embodiment of the cable or tube guiding assembly according to an embodiment of the invention.

FIG. 3 is a lateral view of a guiding roller with guiding recesses 49 placed on top of one another. In such a guiding roller arrangement, the cables 37 are guided in canals arranged between the guiding recesses 49 and the outer circumference 14 of the rotatable body 11 or the inner circumference 15 of the housing 13.

Figure 4:
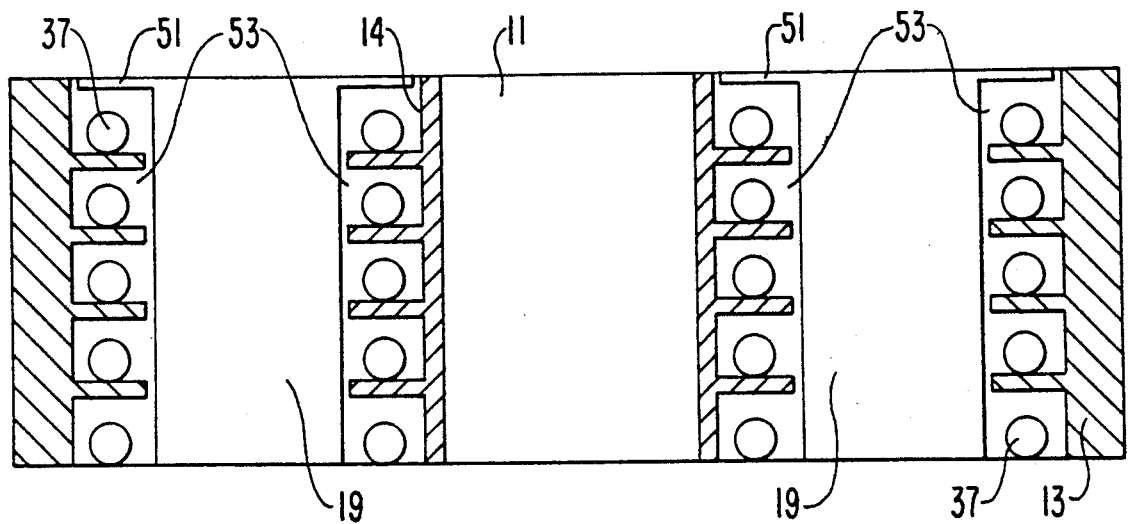
FIG. 4 is a schematic cross-section of another embodiment of a cable or tube guiding assembly according to the invention.

FIG. 4 is a schematic cross-section of an embodiment of the invention in which the guiding rollers 19 have a smooth outer circumference and are provided with radial flanges 51 only at their top, as a covering. In this embodiment, guiding recesses 53 are arranged in the outer circumference 14 of the rotatable body 11 and the inner circumference 15 of the housing 13.

Alternatively, both the outer circumferences of the guiding rollers 19 and the outer circumference 14 of the rotatable body 11 and the inner circumference 15 of the housing 13 may be provided with guiding recesses 49 and 53, respectively. In this case, each canal for accommodating the cables is formed by two guiding recesses 49 and 53 facing each other.

Figure 5:
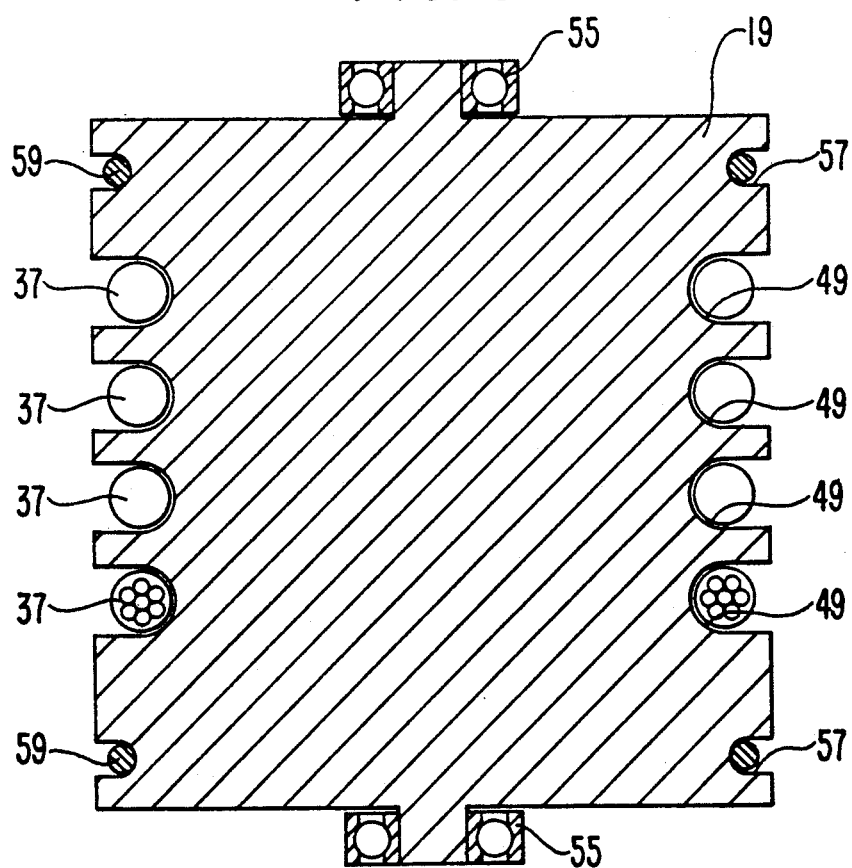
FIG. 5 is an axial sectional view of a guiding roller with two steel ropes for indirect drive.

FIG. 5 is an axial sectional view of a guiding roller with guiding recesses 49, in which cables or tubes 37 are loosely guided. Additionally, a groove 57 for taking up a traction rope 59, preferably in the form of a steel rope, is provided at each axial end of the guiding roller. The dimensions of the grooves 57 for the ropes are such that the traction ropes 59 are tautly guided in the groove 58 to ensure slip-free drive of the guiding rollers 19 by the traction ropes 59.

Figure 6:
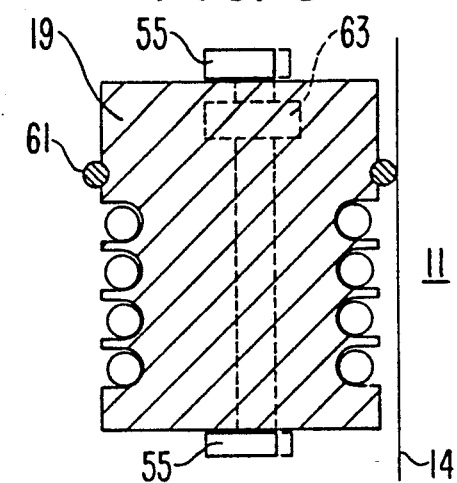
FIG. 6 is an axial sectional view of a guiding roller with a friction ring for frictional direct drive.
Figure 7:
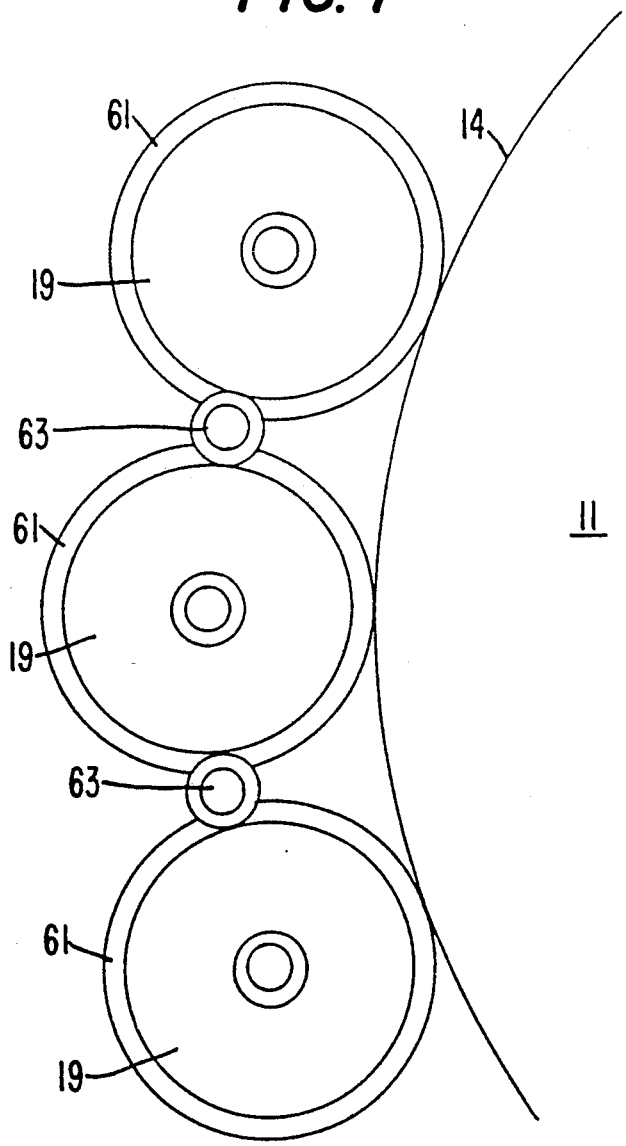

FIGS. 6 and 7 show an embodiment of the invention, where the individual guiding rollers are directly driven by frictional engagement with the outer circumference 14 of the rotatable body 11. For this purpose, the outer circumference of each guiding roller incorporates a friction ring 61, preferably in the form of an O-ring made from rubber or a rubber-like plastic. The friction ring 61 runs on the outer circumference 14 of the rotatable body 11. As shown in FIG. 7, spacer rollers 63 are arranged between the guiding rollers 19 in order to prevent circumference regions of adjacent guiding rollers 19 which move in opposite directions from touching each other. In the embodiment shown in FIG. 7, the spacer rollers 63 run on a region of the circumference of the guiding rollers 19 lying outside of the friction rings 61. Of course it is equally feasible to make the spacer rollers 63 run on the friction rings 61.

Figure 8:
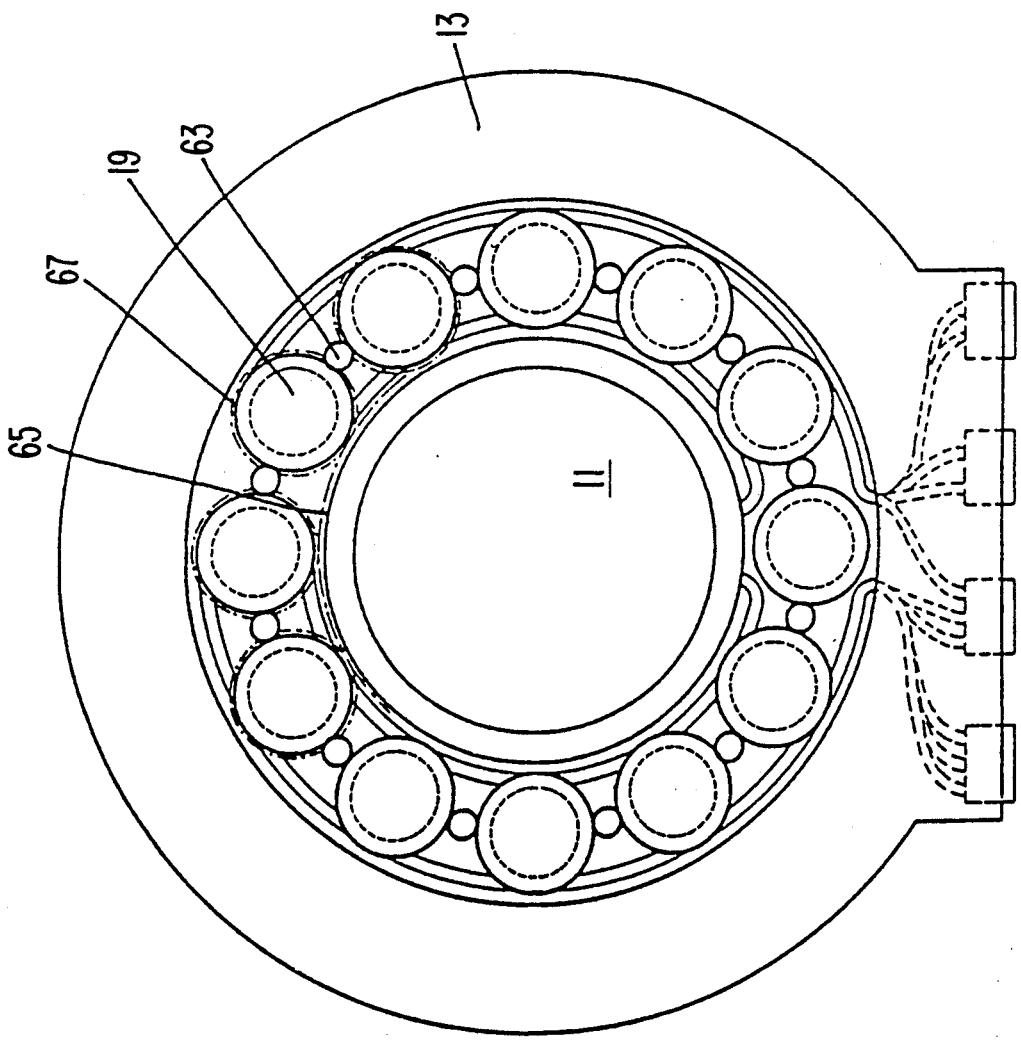
FIG. 8 is a top view, similar to FIG. 1 of an embodiment of the invention with direct mechanical drive of the guiding rollers by means of toothed rings.

FIG. 8 shows an embodiment with a mechanical direct drive between the rotatable body 11 and the guiding rollers. The outer circumference 14 of the rotatable body 11 is provided with a toothed ring 65, with which toothed rings 67, which are arranged around the circumference of the guiding rollers 19 or which are formed by toothed wheels at the axial ends of the guiding rollers 19, engage mechanically. Spacer rollers or wheels 63 are arranged between the individual guiding rollers 19.

Figure 9:
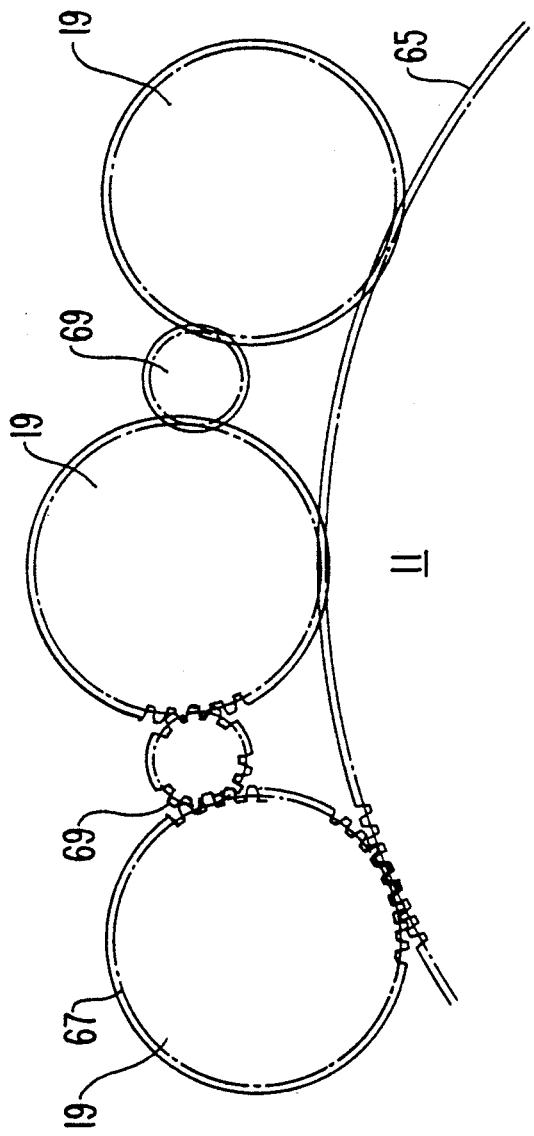
FIG. 9 is an enlarged sectional view of an embodiment according to FIG. 8, with spacer rollers between the guiding rollers.
Figure 10:
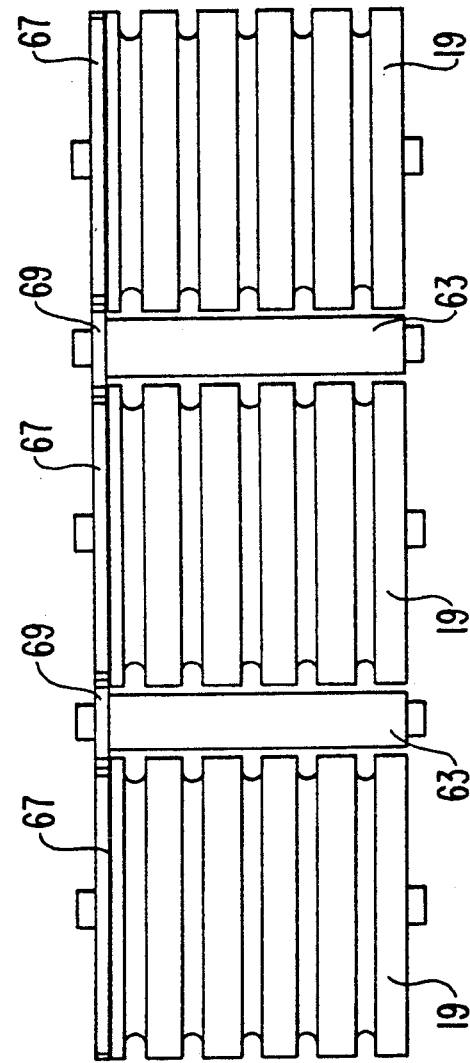
FIG. 10 is a lateral view of the guiding and spacer rollers shown in FIG. 9.

FIG. 9 shows a segment of the embodiment shown in FIG. 8. Three guiding rollers 19 are shown, each of them is provided with a toothed ring 67 which engages with the toothed ring 65 at the outer circumference 14 of the rotatable body 11. The spacer rollers 63 are equipped with toothed wheels 69, each of which engage with toothed rings 67 of two adjacent guiding rollers 19. As shown in FIG. 10, the toothed rings 67 and the toothed wheels 69 are mounted to one axial end of the guiding rollers 19 or the spacer rollers 63. The toothed rings 67 and the toothed wheels 69 may also be mounted to the other axial ends of guiding rollers 19 or spacer rollers 63, or to both axial ends.

Figure 11:
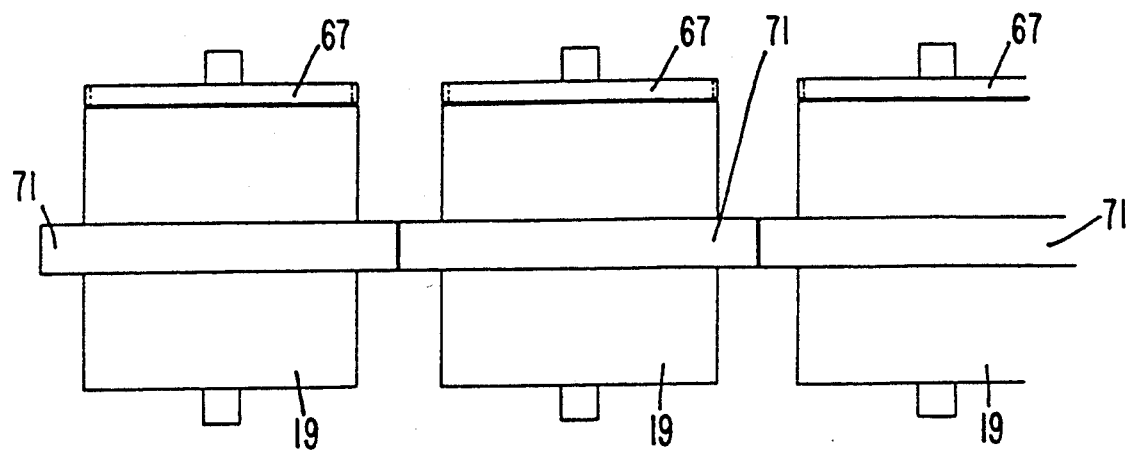
FIG. 11 is a lateral view of an embodiment of the invention with ball bearing rings as spacer elements between the guiding rollers.
Figure 12:
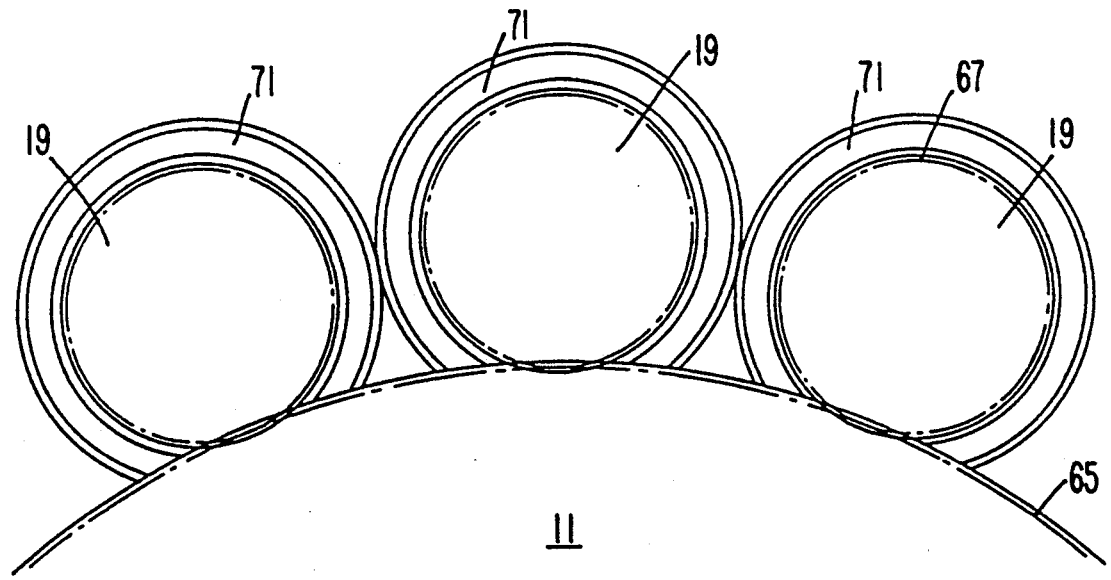
FIG. 12 is a top view of the three guiding rollers shown in FIG. 11, with ball bearing rings.

FIGS. 11 and 12 show an embodiment with a direct mechanical drive, where the spacers are formed by ball bearing rings 71, which are arranged at an axial, centered position on the outer circumference of the guiding rollers 19. While the rotatable body 11 turns, the guiding rollers 19 all turn in the same direction due to the mechanical engagement between the toothed rings 65 and 67. The outer circumferences of adjacent ball bearing rings 71 run without affecting the rotational movement of the guiding rollers 19.

Alternatively, the ball bearing rings 71 may be arranged at a different axial point of the guiding rollers 19, for example at the axial end which does not display a toothed ring 67, or at both axial ends.

Figure 13:
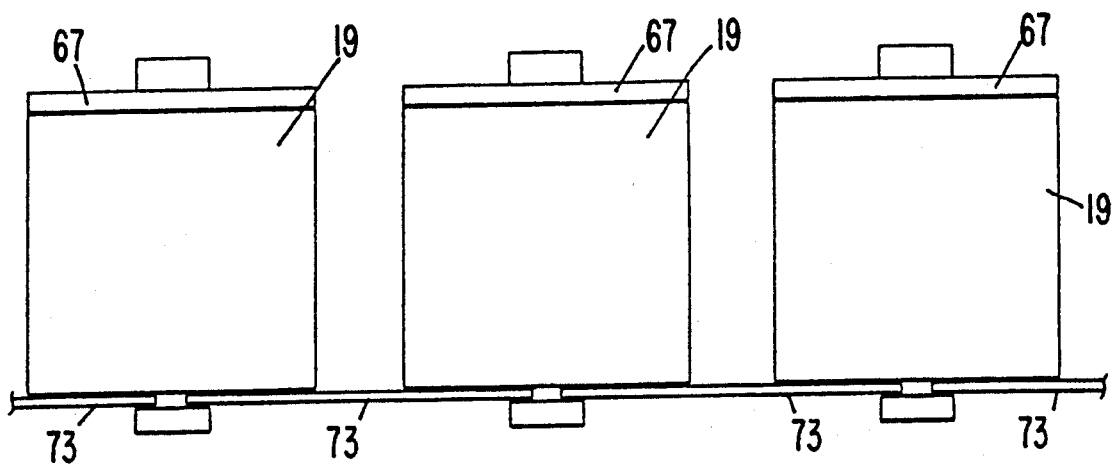
FIG. 13 is a lateral view of an embodiment of the invention with spacer bars between the guiding rollers.
Figure 14:
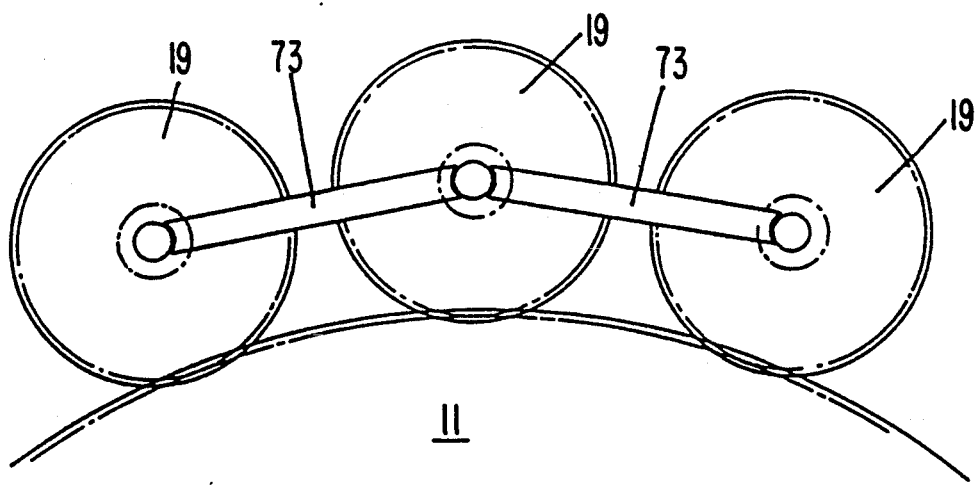
FIG. 14 is a top view of the three guiding rollers shown in FIG. 13, with spacer bars.

FIGS. 13 and 14 show another possibility of keeping the individual guiding rollers 19 apart. In this case, the construction incorporates spacer bars 73, the ends of which are each rotatably supported at the axle noses of two adjacent guiding rollers 19. In the embodiment shown in the figure, the spacer bars are attached to the axle noses containing no toothed rings 67. The spacer bars may also be linked to the axle noses adjacent to the toothed rings 67, or the guiding rollers may be linked by spacer bars 73 at both axial ends.

I claim:

1. An assembly for guiding cables between a stationary part and rotating part following movements of a bidirectionally rotatable body, comprising a plurality of cables arranged adjacent to each other in the direction of an axis of rotation and in a U-loop running concentrically around the axis of rotation, wherein strand ends belonging to different loop strands are connected with the stationary part and the rotating part, respectively, wherein the cables are distributed between two loops, running in opposite directions and located at opposite sides of the axis of rotation, wherein guiding rollers are arranged concentrically around the axis of rotation of the rotatable body in a ring arrangement, the axes of rotation of these guiding rollers being parallel to the axis of rotation of the rotatable body; the guiding rollers being arranged between the loop strands of the loops and being driven by rotatory movements of the rotating body in that the circumferential speed of the guiding rollers equals the speed at which the loop strands unwind on the rotatable body and the guiding rollers, and wherein the guiding rollers are kept displaceable and rotatable at each longitudinal axial end in a guiding groove of a guiding plate.

2. An assembly of claim 1, wherein at least one of the guiding grooves is in the shape of a T and axle noses of the guiding rollers supported therein are each provided with a complementary T-profile.

3. An assembly of claim 1, wherein the guiding rollers run in ball bearings at least at one axial end.

4. An assembly of claim 1, wherein each guiding groove is

5. An assembly of claim 1 wherein the guiding rollers drive each other and wherein reversing elements are arranged between the guiding rollers for reversing the direction of rotation of adjacent guiding rollers so that all guiding rollers drive each other.

6. An assembly of claim 1 wherein the guiding rollers drive each other and where a traction rope is guided in at least one groove of each guiding roller, such that said rope lies tautly in said groove and that, while the rotatable body turns, the guiding roller located in the tip of the loop with a decreasing outer strand is driven by the rope so that the cables lie loosely in their guiding recesses.

7. An assembly of claim 5, wherein a toothed belt is guided in at least one tooth of each guiding roller.

8. An assembly of claim 1, wherein the circumferences of the guiding rollers engage with the circumference of the rotatable body to effect frictional or mechanical drive.

9. An assembly of claim 8, wherein the circumference of each guiding roller is surrounded by at least one friction ring.

10. An assembly of claim 9, wherein the guiding rollers are kept apart by intermediate spacer elements to prevent them from engaging with each other.

11. An assembly of claim 10, wherein the spacer elements are formed by spacer rollers, which are arranged between adjacent guiding rollers and engage by friction or mechanical action with the latter.

12. An assembly of claim 11, wherein the spacer rollers are formed by ball bearing rings arranged concentrically around the guiding rollers.

13. An assembly of claim 8, wherein each guiding roller is provided with at least one toothed ring which engages with a complimentarily shaped toothed ring on the rotatable body.

14. An assembly of claim 8, wherein the guiding rollers also engage with a canal boundary by friction or mechanical action.

* * * * *